(12) United States Patent
Sakamoto

(10) Patent No.: US 9,332,563 B2
(45) Date of Patent: May 3, 2016

(54) WIRELESS COMMUNICATION DEVICE, MEMORY DEVICE, WIRELESS COMMUNICATION SYSTEM, WIRELESS COMMUNICATION METHOD, AND COMPUTER PROGRAM PRODUCT

(71) Applicant: OLYMPUS CORPORATION, Tokyo (JP)

(72) Inventor: Akihiko Sakamoto, Sagamihara (JP)

(73) Assignee: OLYMPUS CORPORATION, Tokyo (JP)

( * ) Notice: Subject to any disclaimer, the term of this patent is extended or adjusted under 35 U.S.C. 154(b) by 372 days.

(21) Appl. No.: 13/859,291

(22) Filed: Apr. 9, 2013

(65) Prior Publication Data

US 2013/0272276 A1 Oct. 17, 2013

(30) Foreign Application Priority Data

Apr. 11, 2012 (JP) .................................. 2012-090488

(51) Int. Cl.
*H04W 72/12* (2009.01)
*H04W 56/00* (2009.01)
(Continued)

(52) U.S. Cl.
CPC .............. *H04W 72/12* (2013.01); *H04W 56/00* (2013.01); *H04W 28/02* (2013.01); *H04W 28/20* (2013.01); *H04W 72/0413* (2013.01); *H04W 72/0446* (2013.01); *H04W 88/06* (2013.01)

(58) Field of Classification Search
CPC ..................................................... H04W 28/20
USPC ................................. 370/311, 336, 389, 412
See application file for complete search history.

(56) References Cited

U.S. PATENT DOCUMENTS 2,008 A * 3/1841 Cornelius ........................ 285/11
5,123,029 A * 6/1992 Bantz ..................... H04B 1/713
375/133
(Continued)

FOREIGN PATENT DOCUMENTS

JP 11-331933 A 11/1999
JP 2000-217146 A 8/2000
(Continued)

OTHER PUBLICATIONS https://www.bluetooth.org/apps/content/, Specification of the Bluetooth system (vol. 4.0), Jun. 30, 2010, pp. 1-88.
(Continued)

*Primary Examiner* — Andrew Lai
*Assistant Examiner* — Andrew C Lee
(74) *Attorney, Agent, or Firm* — Westerman, Hattori, Daniels & Adrian, LLP

(57) ABSTRACT

A wireless communication includes: a communication unit; a storage unit; a transmission buffer; and a controller. The communication unit wirelessly communicates with a reception terminal. The storage unit stores information relating to a timing at which the reception terminal changes from a first state to a second state. The first state is a state of being able to receive data and continues for a first period. The second state is a state of being unable to receive data and continues for a second period. The first period is extended by a fixed duration when the reception terminal in the first state receives data. The transmission buffer temporarily stores segmented data constituting transmission data to be transmitted to the reception terminal. The controller controls the communication unit to wirelessly transmit dummy data to the reception terminal by the timing if the segmented data is not stored in the storage unit.

20 Claims, 19 Drawing Sheets

(51) Int. Cl.
*H04W 28/20* (2009.01)
*H04W 72/04* (2009.01)
*H04W 28/02* (2009.01)
*H04W 88/06* (2009.01)

(56) References Cited

U.S. PATENT DOCUMENTS

| | | | | |
|---|---|---|---|---|
| 6,697,331 | B1* | 2/2004 | Riihinen | H04L 1/1614 370/236 |
| 6,807,159 | B1* | 10/2004 | Shorey | H04L 12/12 370/318 |
| 6,990,070 | B1* | 1/2006 | Aweya | H04L 47/10 370/230 |
| 7,522,526 | B2* | 4/2009 | Yi | H04L 1/1841 370/236 |
| 8,170,482 | B2* | 5/2012 | Linsky | H04L 7/10 455/39 |
| 8,411,583 | B2* | 4/2013 | Chun | H04L 1/1685 370/252 |
| 8,681,671 | B1* | 3/2014 | Hui | H04W 52/0225 370/311 |
| 8,780,719 | B2* | 7/2014 | Nishimura | H04L 47/10 370/232 |
| 2003/0197488 | A1* | 10/2003 | Hulvey | G06F 1/3203 320/135 |
| 2003/0202501 | A1* | 10/2003 | Jang | H04L 1/1685 370/346 |
| 2004/0223467 | A1* | 11/2004 | Hundal | H04W 16/14 370/328 |
| 2004/0266494 | A1* | 12/2004 | Ruuska | H04W 52/0216 455/574 |
| 2005/0053084 | A1* | 3/2005 | Abrol | H04L 1/1874 370/412 |
| 2005/0243782 | A1* | 11/2005 | Sakoda | H04L 47/10 370/338 |
| 2006/0128308 | A1* | 6/2006 | Michael | H04W 24/00 455/41.2 |
| 2006/0176862 | A1* | 8/2006 | Ishimori et al. | 370/338 |
| 2007/0003211 | A1* | 1/2007 | Gregory | H04N 21/23406 386/264 |
| 2007/0106924 | A1* | 5/2007 | Seidel | H04L 1/1845 714/748 |
| 2007/0254657 | A1* | 11/2007 | Satoh | H04M 1/7253 455/435.2 |
| 2008/0043619 | A1* | 2/2008 | Sammour et al. | 370/231 |
| 2008/0095091 | A1* | 4/2008 | Surineni | H04W 52/0225 370/311 |
| 2009/0077159 | A1* | 3/2009 | Murakami | H04L 67/28 709/202 |
| 2009/0137206 | A1* | 5/2009 | Sherman | H04W 16/14 455/41.2 |
| 2009/0149127 | A1* | 6/2009 | Viitamaki | H04M 1/0245 455/41.2 |
| 2010/0029230 | A1* | 2/2010 | Linsky | H04L 7/10 455/130 |
| 2010/0099358 | A1* | 4/2010 | Kumar | H04B 1/1615 455/41.3 |
| 2010/0112950 | A1* | 5/2010 | Haartsen | H04B 5/0056 455/41.3 |
| 2010/0195636 | A1* | 8/2010 | Nakashima | H04W 72/12 370/342 |
| 2012/0173901 | A1* | 7/2012 | Soliman | H04W 88/182 713/320 |

FOREIGN PATENT DOCUMENTS

| | | |
|---|---|---|
| JP | 2002-271341 A | 9/2002 |
| JP | 2003-087185 A | 3/2003 |
| WO | 02/30059 A2 | 4/2002 |

OTHER PUBLICATIONS

Office Action dated Feb. 16, 2016, issued in counterpart Japanese Patent Application No. 2012-090488, with English translation. (4 pages).

* cited by examiner

| ITEM | TERMINAL A | TERMINAL B | ... |
|---|---|---|---|
| RECEPTION INTERVAL | AA SECONDS | XX SECONDS | |
| INITIAL RECEPTION AVAILABLE PERIOD | BB SECONDS | YY SECONDS | ... |
| EXTENSION PERIOD | CC SECONDS | ZZ SECONDS | |

WIRELESS COMMUNICATION DEVICE, MEMORY DEVICE, WIRELESS COMMUNICATION SYSTEM, WIRELESS COMMUNICATION METHOD, AND COMPUTER PROGRAM PRODUCT

BACKGROUND OF THE INVENTION

1. Field of the Invention

The present invention relates to a technology of wirelessly transmitting data to a reception terminal having a reception available state and a reception unavailable state, and being configured to extend a current reception available period in the case of receiving data in the reception available state.

Priority is claimed on Japanese Patent Application No. 2012-090488, filed Apr. 11, 2012, the content of which is incorporated herein by reference.

2. Description of the Related Art

Bluetooth (trademark) is the standard for short-range wireless communication in a wireless network (hereinafter, a "piconet") including one controlling terminal (hereinafter, "master") and one or more controlled terminals (hereinafter, "slaves") or wireless communication between devices requiring low power consumption. Regarding the short-range wireless communication, data are transmitted between the master and the slaves under control of the master.

Additionally, the Bluetooth (trademark) is the standard for wireless communication based on various definitions disclosed in, for example, "SPECIFICATION OF THE BLUETOOTH SYSTEM (ver. 4.0)" (hereinafter, "Non-Patent Document 1"). A communication method using the Bluetooth (trademark) is defined by various documents disclosed on Bluetooth SIG (https:/www.bluetoofh.org/apps/content/).

Regarding the Bluetooth (trademark), a low power consumption mode called a "sniff mode", which is slave specific, is defined. In the sniff mode, as shown in FIG. 1, each reception interval (hereinafter, "sniff interval") includes a reception available period (hereinafter, "sniff slot") and a reception unavailable period. The sniff slot commences from a transmission period start point (hereinafter, "anchor point"). In the sniff slot, data can be transmitted. The reception unavailable period commences from the end of the sniff slot. In the reception unavailable period, data cannot be transmitted, and a process relating to transmission and reception is not performed, thereby reducing the power consumption.

The sniff mode is further defined as follows. As shown in FIG. 2, in a case where the slave receives data from the master in a predetermined initial period (hereinafter, a "sniff attempt") included in the sniff slot, the slave extends the sniff slot by a predetermined extension duration (hereinafter, a "sniff timeout") from the time when the slave receives the data. Thus, even in a case where fragmented data (segmented data) are transmitted from tire master, the slave does not enter the transmission unavailable state until transmission of all the fragmented packets is complete,

SUMMARY

A wireless communication terminal according to one aspect of the present invention includes, but is not limited to: a communication unit; a storage unit; a transmission buffer; and a controller. The communication unit is configured to wirelessly communicate with a reception terminal. The storage unit is configured to store timing information relating to a timing at which the reception terminal changes from a first state to a second state. The first state is a state of being able to receive data and continuing for a first period. The second state is a state of being unable to receive data and continuing for a second period. The first period is extended by a fixed duration in a case that the reception terminal in the first state receives data. The transmission boiler is configured to temporarily store a plurality of segmented data constituting transmission data to be transmitted from the communication unit to the reception terminal. The controller is configured to control the communication unit to wirelessly transmit dummy data to the reception terminal by the timing in a case that the segmented data is not stored in the storage unit by the timing.

A memory device according to another aspect of the present invention includes, but is not limited to: a communication unit; a storage unit; a transmission buffer; and a controller. The communication unit is configured to wirelessly receive from a reception terminal, timing information relating to a timing at which the reception terminal changes from a first state to a second state. The first state is a state of being able to receive data and continuing for a first period. The second state is a state of being unable to receive data and continuing for a second period. The first period is extended by a fixed duration in a case that the reception terminal in the first state receives data. The storage unit is configured to store the timing information. The transmission buffer is configured to temporarily store a plurality of segmented data constituting transmission data to be transmitted from the communication unit to the reception terminal. The controller is configured to control the communication unit to wirelessly transmit dummy data to the reception terminal by the timing in a case that the segmented data is not stored in the storage unit by the timing.

A wireless communication system according to another aspect of the present invention includes, but is not limited to: a reception terminal; and a transmission terminal. The reception terminal has first and second states. The first state is a state of being able to receive data and having a first period. The second state is a state of being unable to receive data and having a second period subsequent to the first period. The first period is extended by a fixed duration in a case that the reception terminal in the first state receives data. The reception terminal includes, but is not limited to, a first communication unit configured to wirelessly communicate with the transmission terminal. The transmission terminal includes, but is not limited to: a second communication unit; a storage unit; a transmission buffer; and a controller. The second communication unit is configured to wirelessly communicate with the reception terminal. The storage unit is configured to store timing information relating to a timing at which the reception terminal changes from the first state to the second state. The transmission buffer is configured to temporarily store a plurality of segmented data that constitute transmission data to be transmitted from the communication unit to the reception terminal. The controller is configured to control the second communication unit to wirelessly transmit dummy data to the reception terminal by the timing in a case that the segmented data is stored in the storage unit by the timing.

A wireless communication method for a transmission terminal according to another aspect of the present invention includes, but is not limited to, the following processes. Information relating to a timing at which a reception terminal changes from a first state to a second state is stored in a storage unit. The first state is a state of being able to receive data and continuing for a first period. The second state is a state of being unable to receive data and continuing for a second period. The first period is extended by a fixed duration in a case that tire reception terminal in the first state receives data. A plurality of segmented data constituting transmission data to be transmitted to the reception terminal are temporarily stored in a transmission buffer. Dummy data is wirelessly transmitted to the reception terminal by the timing in a case that the segmented data are not stored in the storage unit by the timing.

A computer program product according to another aspect of the present invention stores computer-readable instructions that cause a computer of a wireless communication device to execute the following processes. Timing information relating to a timing at which a reception terminal changes from a first state to a second state is stored in a storage unit. The first state is a state of being able to receive data and continuing for a first period. The second state is a state of being unable to receive data and continuing for a second period. The first period is extended by a fixed duration in a case that the reception terminal in the first state receives data. A plurality of segmented data constituting transmission data to be transmitted to the reception terminal are temporarily stored in a transmission buffer. Dummy data is wirelessly transmitted to the reception terminal by the timing in a case that the segmented data are not stored in the storage unit by the timing.

A wireless communication method for a transmission terminal according to another aspect of the present invention includes, but is not limited to, the following processes. First data of a plurality of segmented data is transmitted to a reception terminal in a first period in which a reception terminal can receive data. The first period is followed by a second period in which the reception terminal cannot receive data. The first period is extended by a first duration in a case that the reception terminal receives data in the first period. While the first data is transmitted, whether or not second data of the segmented data is temporarily stored is determined. The second data is transmitted to the reception terminal after the first data. In a case where it is determined that the second data is not temporarily stored, dummy data is transmitted to the reception terminal in the first period extended by the first duration.

A wireless transmission method for a first terminal according to another aspect of the present invention includes, but is not limited to, the following processes. First data of a plurality of segmented data is transmitted to a second terminal in a first period in which the first and second terminals can respectively perform transmission and reception. The first period is followed by a second period in which the first and second terminals can respectively perform reception and transmission. The first and second periods continue alternately. The first period is extended by a first duration in a case that the second terminal receives data in the first period. While the first data is transmitted, whether or not second data of the segmented data is temporarily stored is determined. The second data is transmitted to the reception terminal after the first data. In a case where it is determined that the second data is not temporarily stored, dummy data is transmitted to the reception terminal in the first period extended by the first duration.

BRIEF DESCRIPTION OF THE DRAWINGS

The above features and advantages of the present invention will be more apparent from the following description of certain preferred embodiments taken in conjunction with the following accompanying drawings.

DETAILED DESCRIPTION OF THE PREFERRED EMBODIMENTS

The present invention will now be described herein with reference to illustrative embodiments. The accompanying drawings explain a wireless communication system including a reception terminal and a transmission terminal, and a wireless communication method in the embodiments. The size, the thickness, and the Like of each illustrated portion might be different from those of each portion of an actual device.

Those skilled in the art will recognize that many alternative embodiments can be accomplished using the teachings of the present invention and that the present invention is not limited to the embodiments illustrated herein for explanatory purposes.

Hereinafter, an embodiment of the present invention is explained with reference to the accompanying drawings. A reception terminal of the present embodiment has a state of being able to perform reception (reception available period) and a state of being unable to perform reception (reception unavailable period). In a case where the reception terminal receives data in the reception available period, the reception terminal extends the current reception available period. In a case where a transmission terminal of the present embodiment transmits data obtained by fragmenting data to be transmitted (segmented data), if the fragmented packet is not temporarily stored in a transmission buffer, the transmission terminal transmits a dummy packet to the reception terminal. Thus, the reception available period is extended by the reception terminal. Therefore, the reception terminal does not enter the reception unavailable state until transmission of desired data is complete, thus enabling successful transmission of data.

Figure 1:
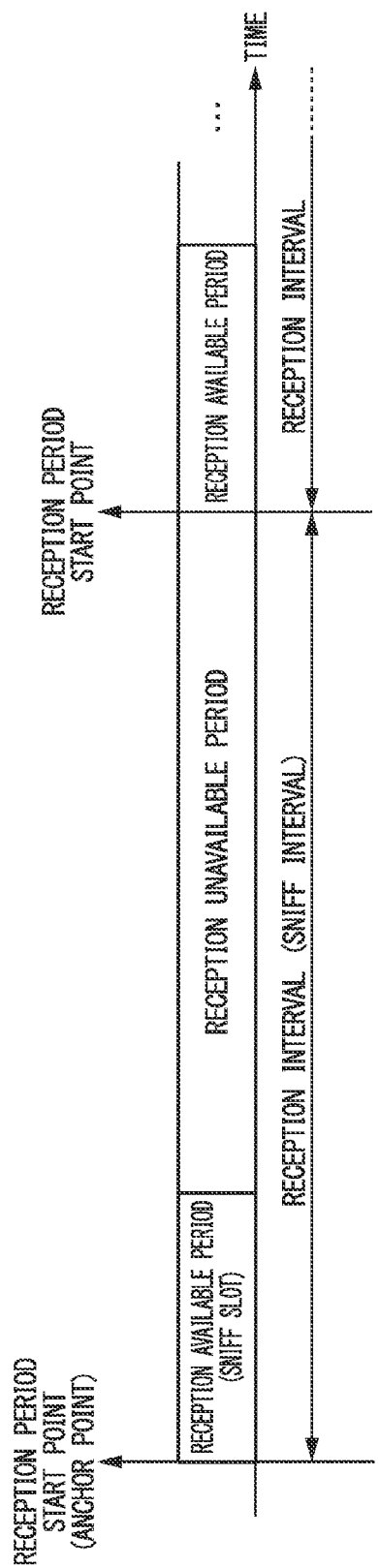
FIG. 1 is a timing chart illustrating a sniff mode.
Figure 2:
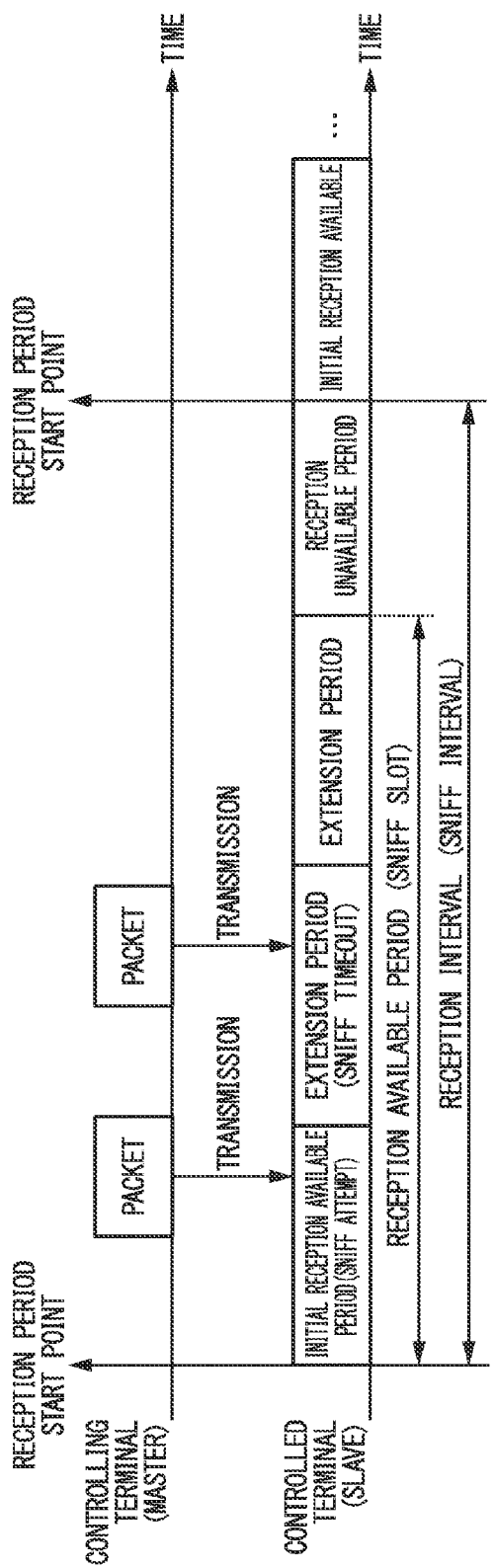
FIG. 2 is a timing chart illustrating the extension of a sniff slot in the sniff mode.
Figure 3:
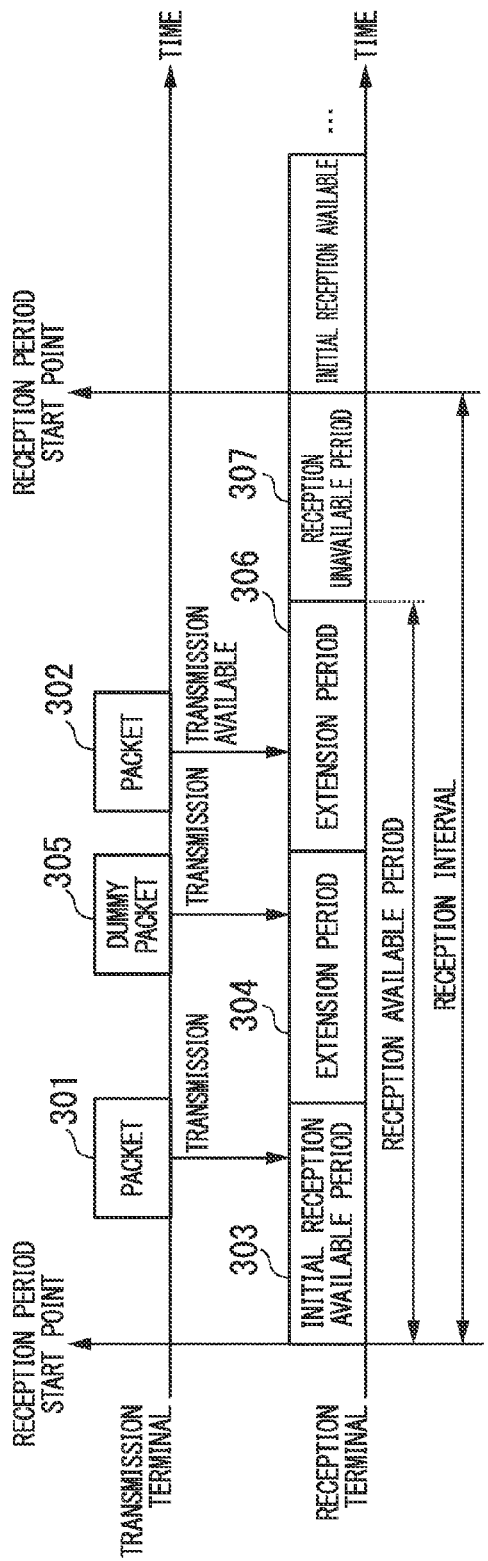
FIG. 3 is a timing chart illustrating a data transmission method according to an embodiment of the present invention.

FIG. 3 illustrates an example of a data transmission method according to the present embodiment. In the example shown in FIG. 3, the transmission terminal and the reception terminal belong to the same wireless network. Under such an environment, the transmission terminal transmits to the reception terminal, data fragmented into two packets 301 and 302. Since the packet 301 is transmitted in an initial reception available period 303 for the reception terminal, the reception available period is extended by an extension period 304. If, in the extension period 304, the packet 302 is not temporarily stored in the transmission buffer of the transmission terminal, the transmission terminal transmits a dummy packet 305 to the reception terminal, thereby further extending the reception available period by an extension period 306. In the extension period 306, the transmission terminal transmits the packet 302 temporarily stored in the transmission buffer, thereby completing transmission of data within the reception available period. After the reception available period ends, the reception unavailable period follows.

Figure 4:
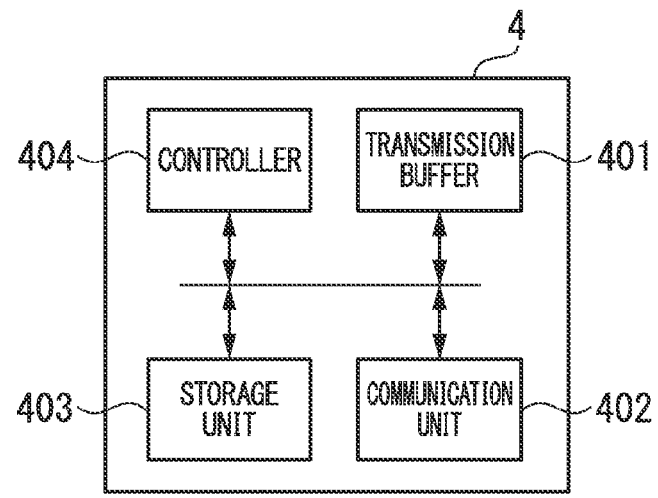
FIG. 4 is a block diagram illustrating a configuration of a transmission terminal according to the embodiment of the present invention.

FIG. 4 illustrates a configuration of the transmission terminal 4 according to the present embodiment. The transmission terminal 4 includes: a transmission buffer 401; a communication unit 402; a storage unit 403; and a controller 404.

Figure 5:
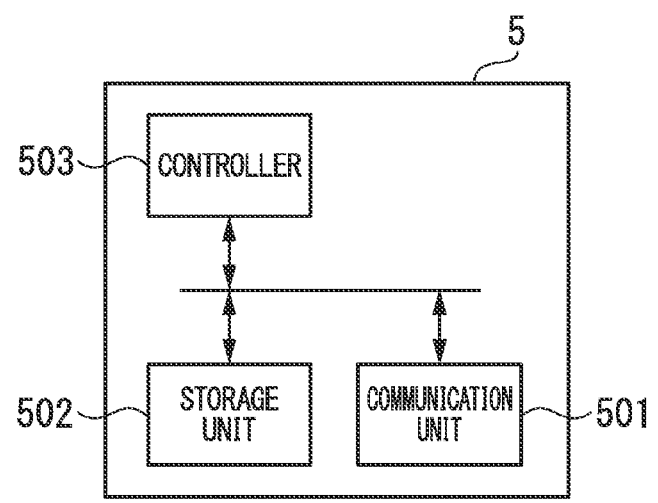
FIG. 5 is a block diagram illustrating a configuration of a reception terminal according to the embodiment of the present invention.

The transmission buffer 401 temporarily stores transmission packets including at least fragmented packets to be transmitted to the reception terminal 5 (shown in FIG. 5). The communication unit 402 wirelessly communicates with the reception terminal 5, thereby performing transmission of the transmission packets temporarily stored in the transmission buffer 401 and reception of intermittent transmission parameters. The intermittent transmission parameters include at least the initial reception available period 303, the extension periods 304 and 306, and the reception interval. The storage unit 403 stores the intermittent transmission parameters and the like.

The controller 404 controls the operation of the transmission terminal 4. More specifically, while the fragmented data are transmitted, the controller 404 identifies the reception available period based on the intermittent transmission parameters stored in the storage unit 403. If a fragmented packet is not temporarily stored in the transmission buffer 401 before the reception available period changes to the reception unavailable period, the controller 404 controls tire communication unit 402 to transmit a dummy packet to the reception terminal 5 before the reception available period changes to the reception unavailable period.

FIG. 5 illustrates a configuration of the reception terminal 5 according to the present embodiment. The reception terminal 5 includes: a communication unit 501; a storage unit 502; and a controller 503.

The communication unit 501 wirelessly communicates with the transmission terminal 4, thereby performing transmission of the intermittent transmission parameters to the transmission terminal 4 and reception of various packets transmitted from the transmission terminal 4. The storage unit 502 stores the intermittent transmission parameters, received packets, and the like. The controller 503 controls the operation of the reception terminal 5, more specifically, controls the transmission state. The transmission terminal 4 and the reception terminal 5 constitute a wireless communication system according to the present embodiment.

Here, a program for implementing the operations and the functions of the transmission terminal 4 and the reception terminal 5 of the present embodiment may be stored in a computer-readable recording medium (corresponding to the storage unit 403 or 502 of the present embodiment). Then, the program stored in the recording medium may be read and executed by a computer of a device having the wireless communication function, thereby implementing the wireless communication terminal of the present embodiment.

Here, the "computer-readable recording medium" includes a portable medium such as a flexible disc, a magneto-optical disc, a ROM, a CD-ROM, a DVD-ROM, or a flash memory, and a storage device such as a hard disk built in the computer system. The "computer-readable recording medium" may include a medium that stores a program for a predetermined period of time, such as a volatile memory (RAM) built in a computer system serving as a server or client in a case where a program is transmitted via a network such as the Internet or a communication line such as a telephone line.

Additionally, the above program may be transmitted from a computer included in a memory device or the like, which stores the above program to another computer via a transmission medium or transmission waves in the transmission medium. Here, the "transmission medium" that transmits the above program means a medium with a function of transmitting information, such as a network like the Internet or a communication line like a telephone line. Further, the above program may be a program for implementing part of the aforementioned functions. Moreover, the above program may be a program that can implement the aforementioned functions in combination with a program already recorded on the computer, that is, the difference file (difference program).

Figure 6:
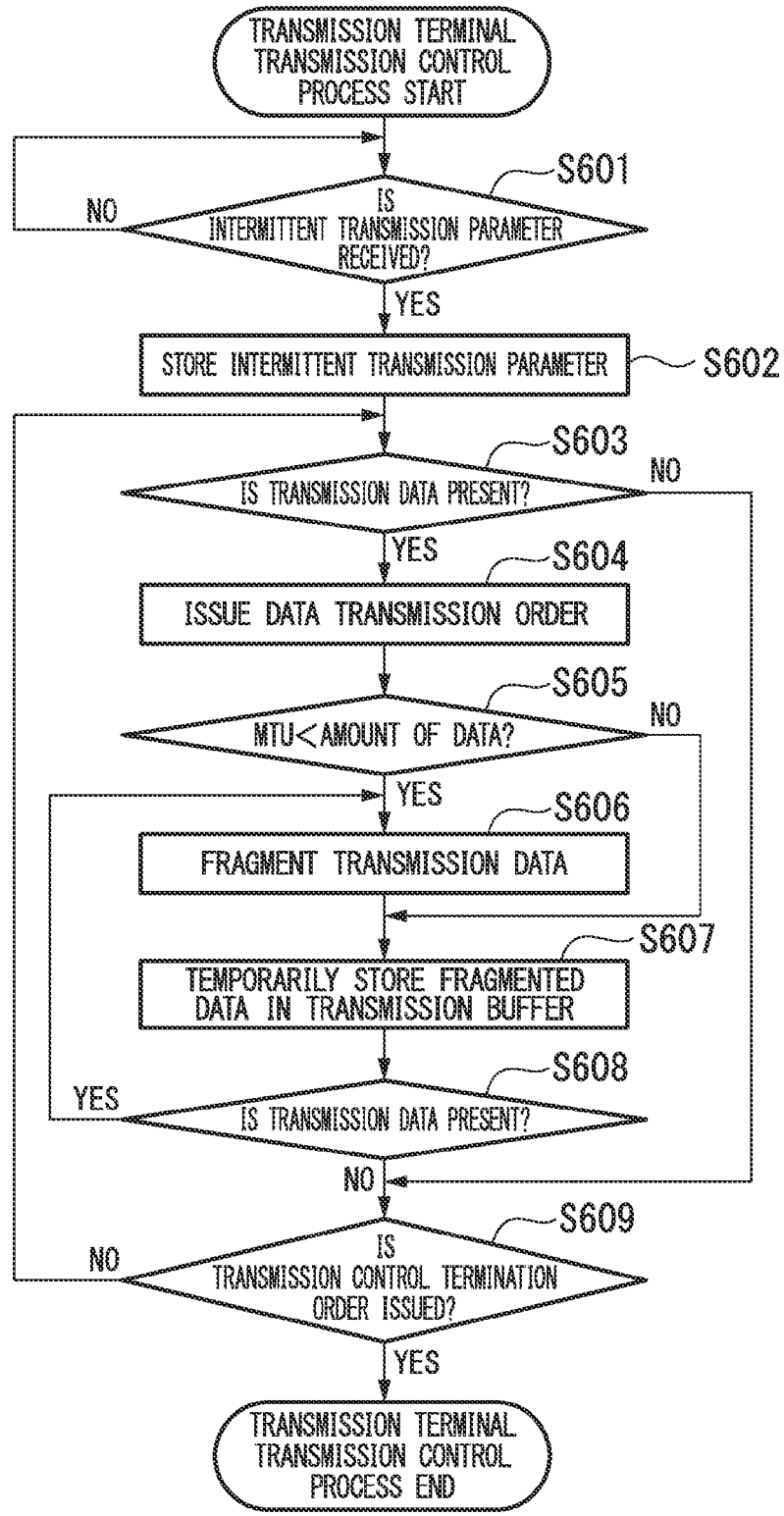
FIG. 6 is a flowchart illustrating an operational procedure for the transmission terminal according to the embodiment of the present invention.

FIG. 6 illustrates the operation of the transmission terminal 4. Upon receiving a transmission terminal transmission control process initiation order that orders the transmission terminal 4 to initiate a transmission control process, the controller 404 initiates the transmission control process, and enters an idle state of waiting for reception of intermittent transmission parameters (step S601). Here, an establishment of a wireless network with the reception terminal triggers an issuance of the transmission terminal transmission control process initiation order of the present embodiment. However, a power-on of the transmission terminal 4, a user input using a user interface added to the transmission terminal 4, a reception of a request from the reception terminal 5, or the like, may trigger the issuance of the transmission terminal transmission control process initiation order. Thus, the trigger is not limited to the establishment of the wireless network with the reception terminal.

Figures 7, 8:
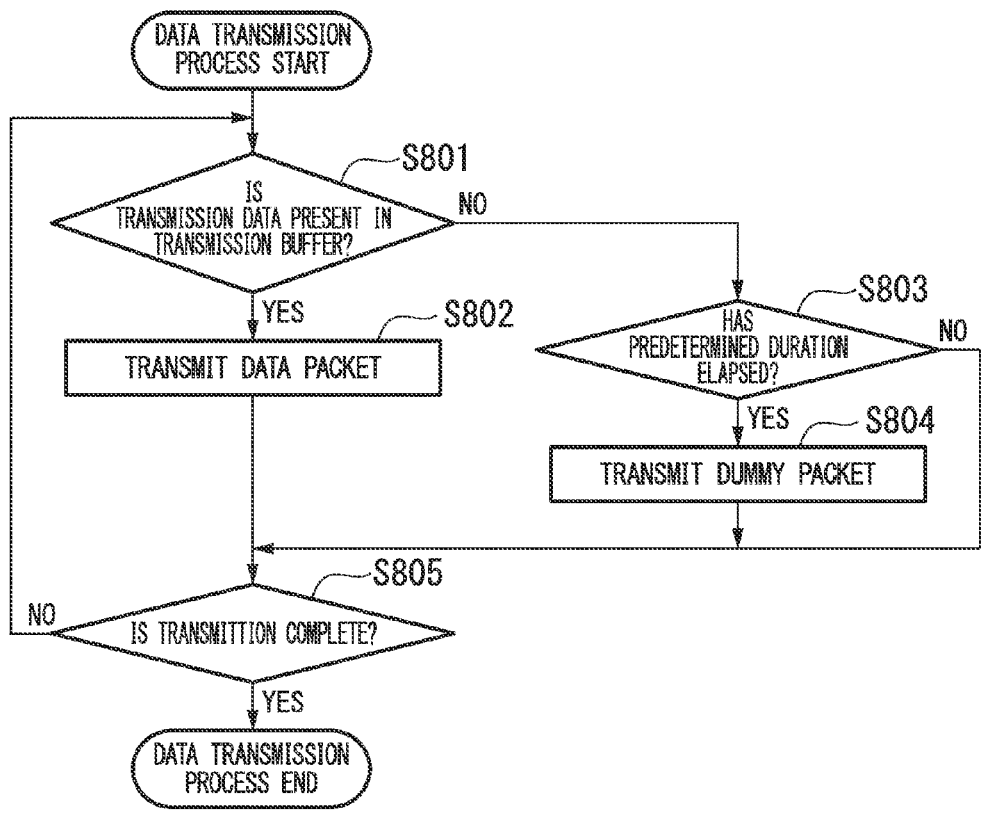
FIG. 7 is a reference diagram illustrating intermittent transmission parameters stored in a storage unit of the transmission terminal according to the embodiment of the present invention.
FIG. 8 is a flowchart illustrating an operational procedure for the transmission terminal according to the embodiment of the present invention.

When the communication unit 402 receives the intermittent transmission parameters, the controller 404 stores tire received intermittent transmission parameters in the storage unit 403 (step S602). As shown in FIG. 7, the intermittent transmission parameters are stored in the storage unit 403 while being correlated to each terminal having transmitted the intermittent transmission parameters.

After the intermittent transmission parameters are stored in the storage unit 403, the controller 404 determines whether or not transmission data to be transmitted to the reception terminal 5 are present in the storage unit 403. If transmission data are present, the operation proceeds to a data transmission order issuance process in step S604. If transmission data are not present, the operation proceeds to a determination process in step S609 of determining whether or not a transmission control termination order has been issued (step S609).

If transmission data are present in step S603, the controller 404 issues a data transmission order that orders initiation of the data transmission process performed in asynchronization with the transmission terminal transmission control process (step S604). The data transmission process that is initiated by the data transmission order will be explained later.

After the data transmission order is issued, the controller 404 determines whether or not the amount of data to be transmitted exceeds an MTU (maximum transmission unit). If the amount of data to be transmitted exceeds the MTU, the operation proceeds to a process of fragmenting the transmission data in step S606. If the amount of data to be transmitted is equal to or smaller than the MTU, the operation proceeds to a transmission buffer temporary storing process in FIG. 607 (step S605).

If the amount of data to be transmitted exceeds the MTU in step S605, the controller 404 fragments (segments) the data to be transmitted (step S606). After the data to be transmitted are fragmented, the controller 404 temporarily stores in the transmission buffer 401, fragment packets including the fragmented data (step S607). If the amount of data to be transmitted is equal to or smaller than the MTU in step S605, the controller 404 temporarily stores the data to be transmitted, as they are, in the transmission buffer 401 (step S607).

After the transmission buffer temporary storing process in step S607 is complete, the controller 404 determines whether or not transmission data not temporarily stored in the transmission buffer 401 are present in the storage unit 403. If no transmission data are present in the storage unit 403, the operation proceeds to a determination process in step S609 of determining whether or not the transmission control termination order has been issued. If transmission data are present in the storage unit 403, the operation is repeated from the transmission data fragmentation process in step S606 (step S608).

If it is determined in step S603 that transmission data to be transmitted to the reception terminal 5 are not present in the storage unit 403, or if it is determined in step S608 that transmission data are not present in the storage unit 403, the controller 404 determines whether or not a transmission control termination order, which orders the transmission terminal 4 to terminate the transmission control process, has been issued. If the transmission control termination order has been issued, the transmission control process ends. If the transmission control termination order has not been issued, the operation is repeated from the determination process in step S603 (step S609). Here, disconnection of the wireless network established with the reception terminal 5 triggers an issuance of the transmission control termination order of the present embodiment. However, a power-off of the transmission terminal 4, a user input using a user interface added to the transmission terminal 5, a reception of a request from the reception terminal 5, or the like, may trigger the issuance of the transmission control termination order. Thus, the trigger is not limited to the disconnection of the wireless network established with the reception terminal 5.

The data transmission process in step S604 is explained here with reference to FIG. 8. The process shown in FIG. 8 is performed in parallel with the process shown in FIG. 6. If a data transmission order is issued in step S604, the controller 404 initiates a data transmission process. Firstly, the controller 404 determines whether or not the transmission data are temporarily stored in the transmission buffer 401. If the transmission data are temporarily stored in the transmission buffer 401, the operation proceeds to a data packet transmission process in step S802. If the transmission data are not temporarily stored in the transmission buffer 401, the operation proceeds to a process in step S803 of determining whether or not a predetermined duration has elapsed (step S801).

If the transmission data are temporarily stored in the transmission buffer 401 in step S801, the controller 404 controls the communication unit 402 to transmit to the reception terminal 5, the transmission data temporarily stored in the transmission buffer 401 (step S802).

If the transmission data are not temporarily stored in the transmission buffer 401 in step S801, the controller 404 determines whether or not the predetermined duration has elapsed after the timing at which the previous packet has been transmitted to the reception terminal 5. If the predetermined duration has elapsed, the operation proceeds to a dummy packet transmission process in step S804. If the predetermined duration has not elapsed, the operation proceeds to a process in step S805 of determining whether or not ail the transmission data have been transmitted (step S803).

The predetermined duration used for the determination in step S803 is a duration used as a threshold for transmitting the dummy packet before the reception terminal 5 enters the reception unavailable state. The predetermined duration is predetermined based on the initial reception available period or the extension period which is included in the intermittent transmission parameters stored in the storage unit 403. In the present embodiment, the predetermined duration may be previously stored in the storage unit 403. Alternatively, a value of the intermittent transmission parameter received from the reception terminal 5 may be used as the predetermined duration.

If the predetermined duration has elapsed in step S803, the controller 404 controls the communication unit 402 to transmit the dummy packet to the reception terminal 5 (step S804). The dummy packet of the present embodiment is assumed to be data predefined between the transmission terminal 4 and the reception terminal 5.

The controller 404 determines whether or not all the transmission data has been transmitted, if the transmission data temporarily stored in the transmission buffer 401 are transmitted to the reception terminal in step S802, if it is determined in step S803 that the predetermined duration has not elapsed, or if the dummy packet has been transmitted to the reception terminal 5 in step S804. If ail the transmission data have been transmitted, the data transmission process ends. If the transmission data having not been transmitted are present, the operation is repeated from the process in step S801 of determining whether or not transmission data are temporarily stored in the transmission buffer 401 (step S805).

Figure 9:
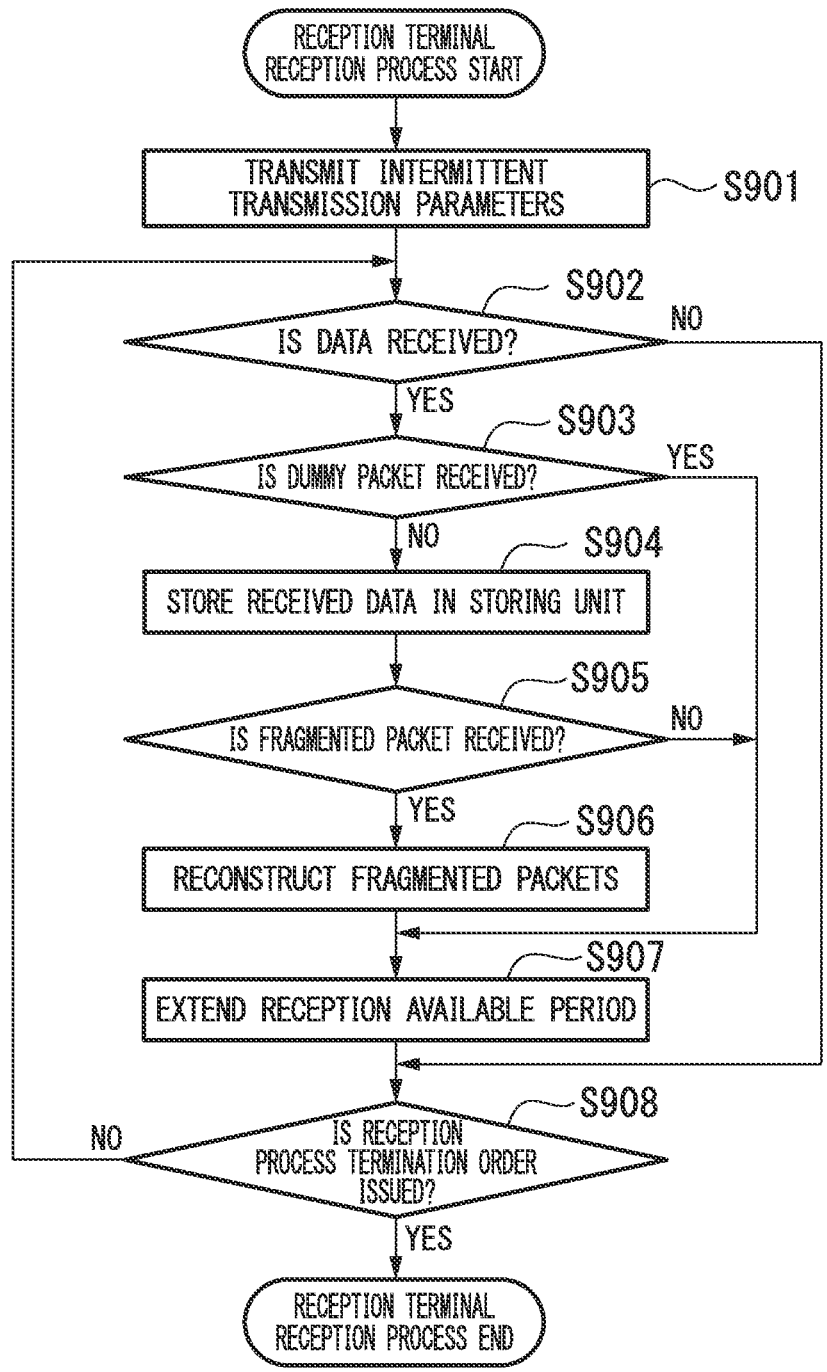
FIG. 9 is a flowchart illustrating an operational procedure for the reception terminal according to the embodiment of the present invention.

FIG. 9 illustrates the operation of the reception terminal 5. Upon receiving a reception terminal reception process initiation order that orders the reception terminal 5 to initiate a reception process, the controller 503 initiates the reception process and controls the communication unit 501 to transmit the intermittent transmission parameters (step S901). Here, an establishment of the wireless network with the transmission terminal 4 triggers an issuance of the reception terminal reception process initiation order of the present embodiment. However, a power-on of the reception terminal 5, a user input using a user interface added to the reception terminal 5, a reception of a request from the transmission terminal 4, or the like, may trigger the issuance of the reception terminal reception process initiation order. Thus, the trigger is not limited to the establishment of the wireless network with the transmission terminal 4. Additionally, it is assumed in the present embodiment that the intermittent transmission parameters to be transmitted in step S901 are previously stored in the storage unit 502 in a similar format to that of the parameters shown in FIG. 7.

After the intermittent transmission parameters are transmitted from the communication unit 501, the controller 503 enters an idle state of waiting for reception of data. If the communication unit 501 receives data from the transmission terminal 4, the operation proceeds to a process in step S903 of determining whether or not a dummy packet is received. If the predetermined duration has elapsed without receiving data, the operation proceeds to a process in step S908 of determining whether or not a reception process termination order has been issued (step S902).

If data is received from the transmission terminal 4 in step S902, the controller 503 determines whether or not the received data is a dummy packet. If the received data is a dummy packet, the operation proceeds to a process in step S907 of extending the reception available period. If the received data is not a dummy packet, the operation proceeds to a process in step S904 of storing the received data In the storage unit 502 (step S903).

If it is determined in step S903 that the data received from the transmission terminal 4 is not a dummy packet, the controller 503 stores the received data in the storage unit 502 (step S904).

After the received data is stored in the storage unit 502, the controller 503 determines whether or not the received data is a fragmented packet. If the received data is not a fragmented packet, the operation proceeds to a process in step S907 of extending the reception available period. If the received data is a fragmented packet, the operation proceeds to a process in step S906 of reconstructing the fragmented packets (step S905).

If it is determined in step S905 that the received packet is a fragmented packet, the controller 503 performs a process of reconstructing the fragmented packets stored in the storage unit 502 (step S906).

If it is determined in step S903 that the received packet is a dummy packet, if it is determined in step S905 that the received data is not a fragmented packet, or if the process of reconstructing the fragmented packets in step S906 is complete, the controller 503 extends the reception available period based on the intermittent transmission parameters stored in the storage unit 502 (step S907).

It is assumed in the present embodiment that the extended reception available period is defined based on the rules:

(1) Duration elapsing from reception period start point+Extension Period<Reception available period before extended Reception available period=Reception available period before extended (2) Reception interval>Duration elapsing from reception period start points+Extension period>Reception available period before extended (3) Duration elapsing from reception period start point+Extension period>Reception interval>Reception available period before extended Reception available period=Reception interval If the predetermined duration has elapsed without receiving data in step S902, or after the reception, available period has been, extended in step S907, the controller 503 determines whether or not a reception process termination order that orders the reception terminal 5 to terminate the reception process has been issued. If the reception process termination order has been issued, the reception process ends. If the reception process termination order has not been issued, the operation is repeated from the data reception waiting process in step S902 (step S908). Here, a disconnection of the wireless network established with the transmission terminal 4 triggers an issuance of the reception process termination order of the present embodiment. However, a power-off of the reception terminal 5, a user input using a user interlace added to the reception terminal 5, a reception of a request from the transmission terminal 4, or the like, may trigger the issuance of the reception process termination order. Thus, the trigger is not limited to the disconnection of the wireless network established with the transmission terminal 4.

According to the present embodiment, it is possible for the reception terminal to maintain the reception available period until transmission of desired data is complete. For this reason, even if a transmission process by the transmission terminal is time consuming, it is possible to reduce a time required for transmission of desired data.

MODIFIED EXAMPLES

The present invention is not limited to the above embodiment. Hereinafter, modified examples of the above embodiment are explained.

First Modified Example

Figure 10:
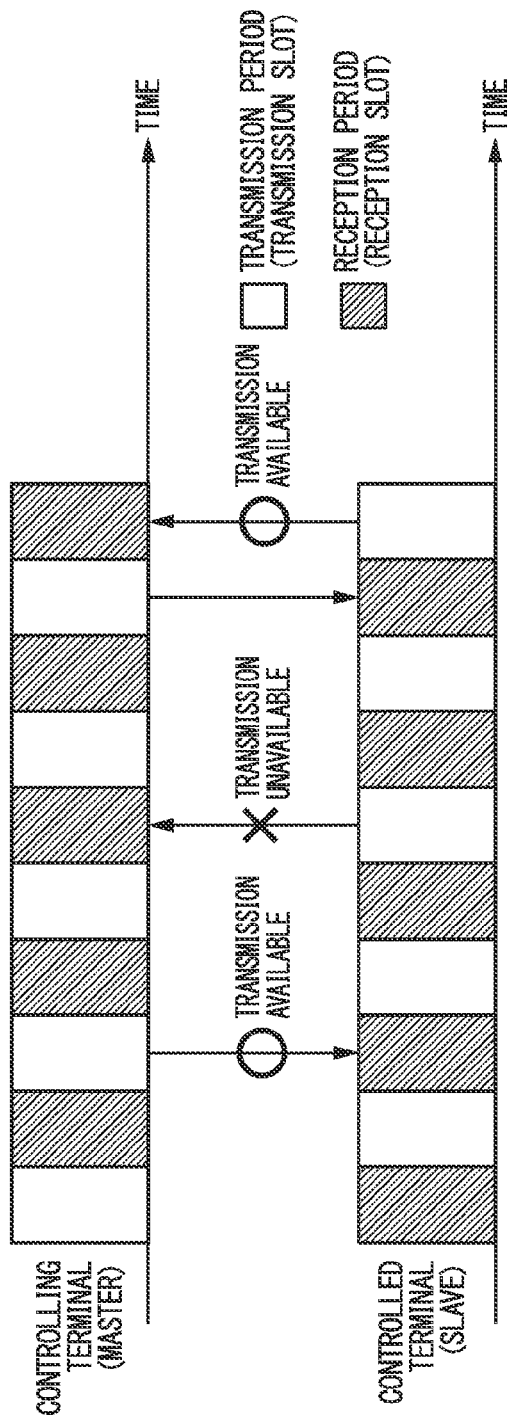
FIG. 10 is a timing chart illustrating communication between terminals defined by the Bluetooth (trademark).

For example, the above embodiment may be applied to the Bluetooth (trademark) communication, and a sniff parameter indicating the reception interval, the reception available period, and the like, may be used as the intermittent transmission parameters. In a case of the Bluetooth (trademark) communication, a transmission period (hereinafter, a "transmission slot") and a reception period (hereinafter, a "reception slot") for a terminal having established a piconet alternate at a predetermined interval, as shown in FIG. 10. In the transmission slot, the terminal enters a transmission available state. In the reception slot, the terminal enters a reception available state. In each slot, the terminal and the other terminal have a mutually complementary relationship, such as a transmission terminal and a reception terminal.

Additionally, in the ease of the Bluetooth (trademark) communication, terminals having established a piconet include a controlling terminal and a controlled terminal, as shown in FIG. 10. The controlling terminal can transmit data to the controlled terminal, in a transmission slot, at a predetermined timing. The controlled terminal can transmit data to the controlling terminal, only in a transmission slot next to the reception slot in which some data are received from the controlling terminal. Only one controlling terminal may be present in a piconet, and multiple controlled terminals may be present in the piconet.

Further, an active mode for the Bluetooth (trademark) communication means a mode in which the transmission slot and the reception slot alternate. A sniff mode for the Bluetooth (trademark) communication means a mode specific for the controlled terminal. In the sniff mode, two types of periods are set in order to reduce the power consumption. One is a period in which the transmission slot and the reception slot alternate. The other is a period in which no process relating to transmission and reception is performed. In a case where the above embodiment is applied to the Bluetooth (trademark) communication, the intermittent mode corresponds to the sniff mode.

In a case where the above embodiment is applied to the Bluetooth (trademark) communication, and the sniff parameters are used as the intermittent transmission parameters, as shown in the first modified example, the transmission terminal 4 serves as the controlling terminal, and the reception terminal 5 serves as the controlled terminal. Additionally, the transmission control process and the reception process are respectively shown in FIGS. 11 and 12.

Figure 11:
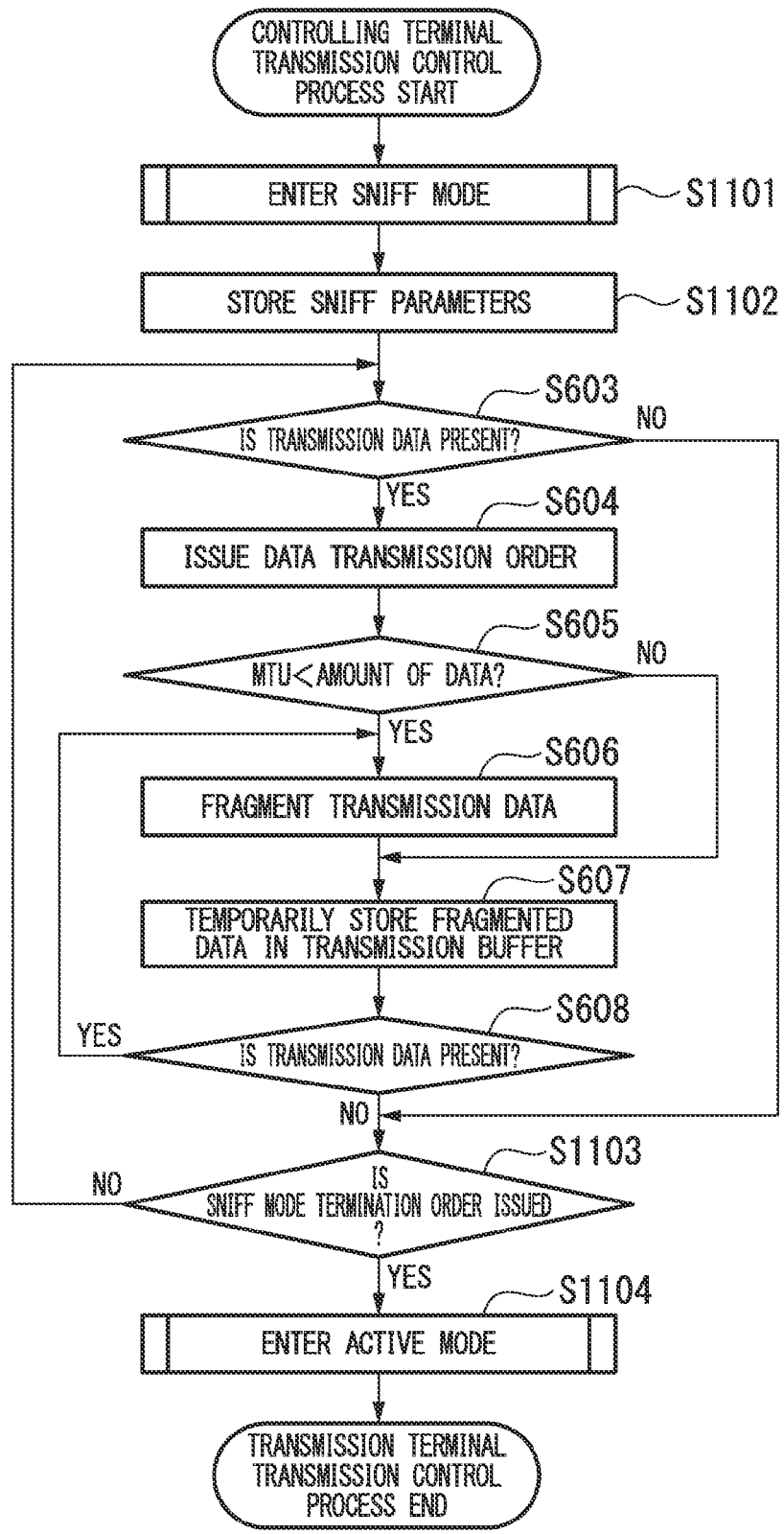
FIG. 11 is a flowchart illustrating an operational procedure for a controlling terminal according to a first modified example of the embodiment of the present invention.
Figure 12:
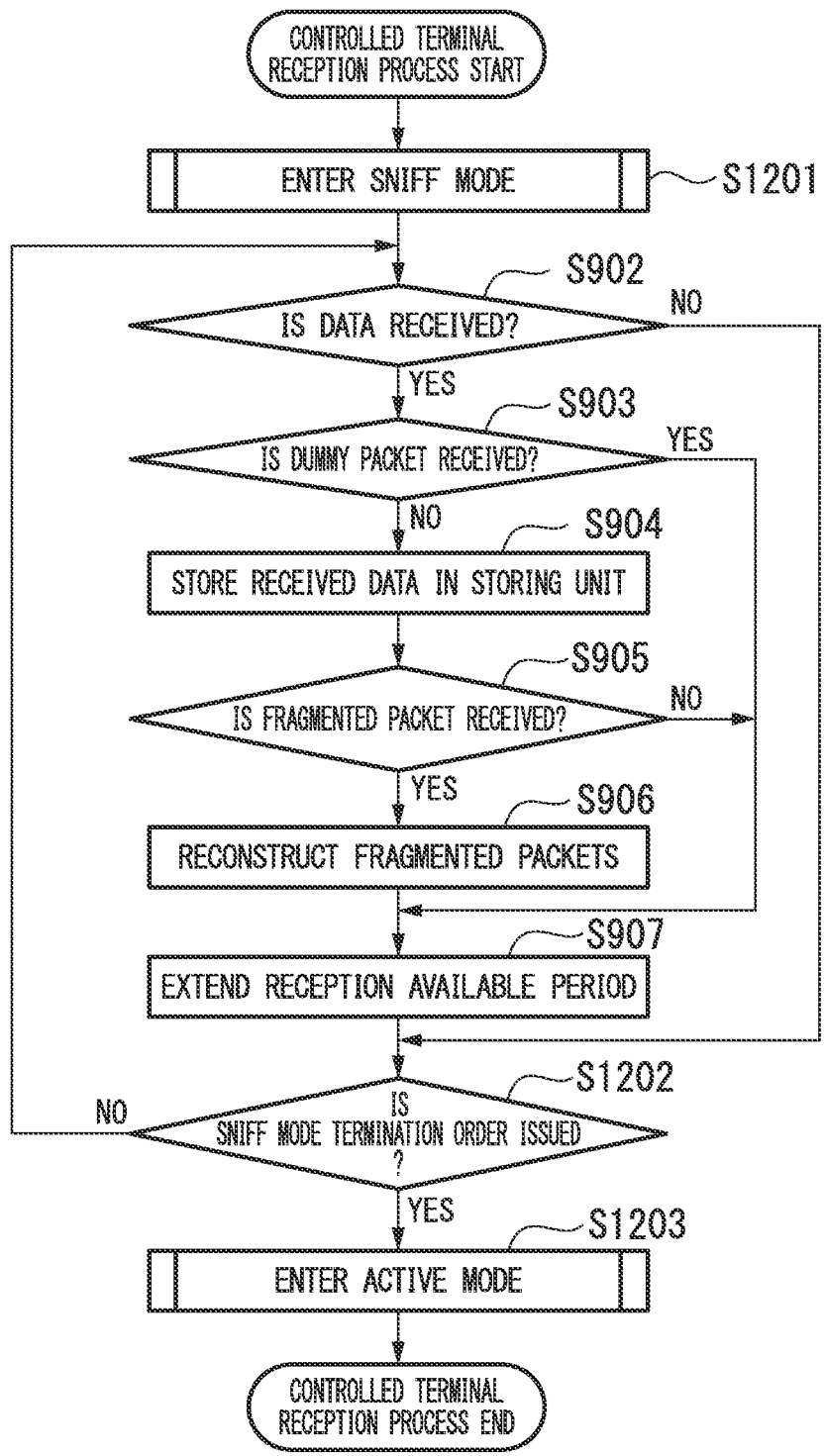
FIG. 12 is a flowchart illustrating an operational procedure for a controlled terminal according to the first modified example of the embodiment of the present invention.

In the operations shown in FIGS. 11 and 12, the processes in steps S601 and 901 of transmitting and receiving the intermittent transmission parameters are replaced with a process of entering the sniff mode in steps S1101 and S1201. The process in step S602 of storing the intermittent transmission parameters is replaced with a process of storing the sniff parameters in step S1102. The process in step S609 of determining whether or not the transmission control termination order has been issued, and the process in step S908 of determining whether or not the reception process termination order has been issued, are replaced with a process in steps S1103 and S1202 of determining whether or not the sniff mode termination order has been issued. Further, if the sniff mode termination order has been issued, an active mode entering process of releasing the sniff mode is performed in steps S1104 and S1203. The sniff mode entering process shown in steps S1101 and S1201, and the active mode entering process in steps S1104 and S1203, will be explained later.

Figure 13:
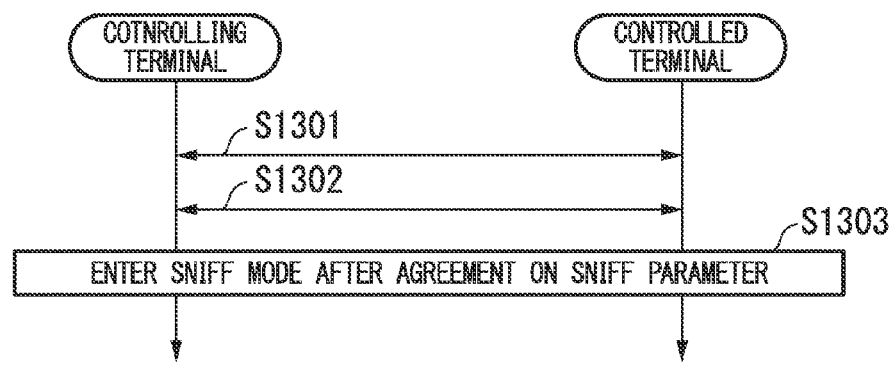
FIG. 13 is a sequence chart illustrating a sniff-mode entering process according to the first modified example of the embodiment of the present invention.

FIG. 13 illustrates a sequence of operations between the controlling terminal and the controlled terminal In order for the controlled terminal to enter the sniff mode from the active mode, in the case of the Bluetooth (trademark) communication. The sniff mode entering process is explained here with reference to FIG. 13.

In the sniff mode entering process, firstly, one of the controlling terminal and the controlled terminal transmits to the other terminal, a sniff mode entering request that orders the controlled terminal to enter the sniff mode from the active mode (step S1301). Here, the sniff mode entering request corresponds to the packet of LMP_Sniff_req disclosed in Non-Patent Document 1, and includes sniff parameters, such as a reception interval, a reception available period, and the like.

If the terminal having received the sniff mode entering request accepts tire request for entering the sniff mode based on the sniff parameters, the terminal having received the request transmits to the other terminal having transmitted the request, a sniff mode entering response indicating acceptance of the request. If the terminal having received the sniff mode entering request rejects the request for entering the sniff mode based on the sniff parameters, the terminal having received the request transmits to the other terminal having transmitted the request, a sniff mode entering response indicating rejection of the request (step S1302). The sniff mode entering response indicating acceptance of the request corresponds to the packet of LMP_accepted disclosed in Non-Patent Document 1. The sniff mode entering response indicating rejection of the request corresponds to the packet of LMP_not_accepted disclosed in Non-Patent Document 1.

If the controlled terminal accepts the sniff mode entering request, the controlled terminal enters the sniff mode in accordance with the sniff parameters (step S1303).

Figure 14:
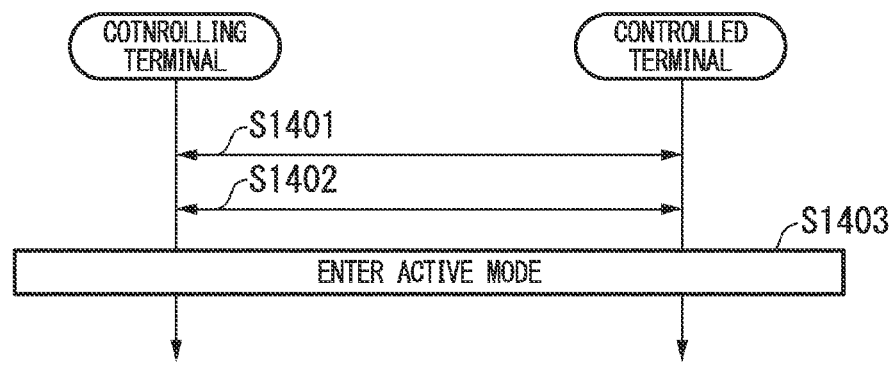
FIG. 14 is a sequence chart illustrating an active-mode entering process according to the first modified example of the embodiment of the present invention.

FIG. 14 illustrates a sequence of the operation between the controlling terminal and the controlled terminal when the controlled terminal enters the active mode from the sniff mode in the case of the Bluetooth (trademark) communication. The active mode entering process is explained here with reference to FIG. 14.

In the active mode entering process, firstly, one of the controlling terminal and the controlled terminal transmits to the other terminal, a sniff mode releasing request that orders tire controlled terminal to enter the active mode from the sniff mode (step S1401). Here, the sniff mode releasing request corresponds to the packet of LMP_unsniff_req disclosed in Non-Patent Document 1, and orders the controlled terminal to terminate tire sniff mode.

The terminal having received the sniff mode releasing request transmits to the other terminal having transmitted the sniff mode releasing request, a sniff mode releasing response indicating acceptance of the request (step S1402). The sniff mode releasing response indicating acceptance of tire request corresponds to the packet of LMP_accepted disclosed in Non-Patent Document 1.

If the controlled terminal accepts the sniff mode releasing request, the controlled terminal enters the active mode (step S1403).

Second Modified Example

A polling packet may be used as a dummy packet in the first modified example where the above embodiment is applied to the Bluetooth (trademark) communication. Here, the polling packet for the Bluetooth (trademark) communication is periodically transmitted from the controlling terminal to the controlled terminal, and orders the controlled terminal to transmit a response.

In a case where the above embodiment is applied to the Bluetooth (trademark) communication, and a polling packet is used as a dummy packet, the transmission terminal 4 serves as the controlling terminal, and the reception terminal 5 serves as the controlled terminal. Additionally, the transmission control process, the data transmission process, and the reception process are respectively shown in FIGS. 15, 16, and 17.

Figure 15:
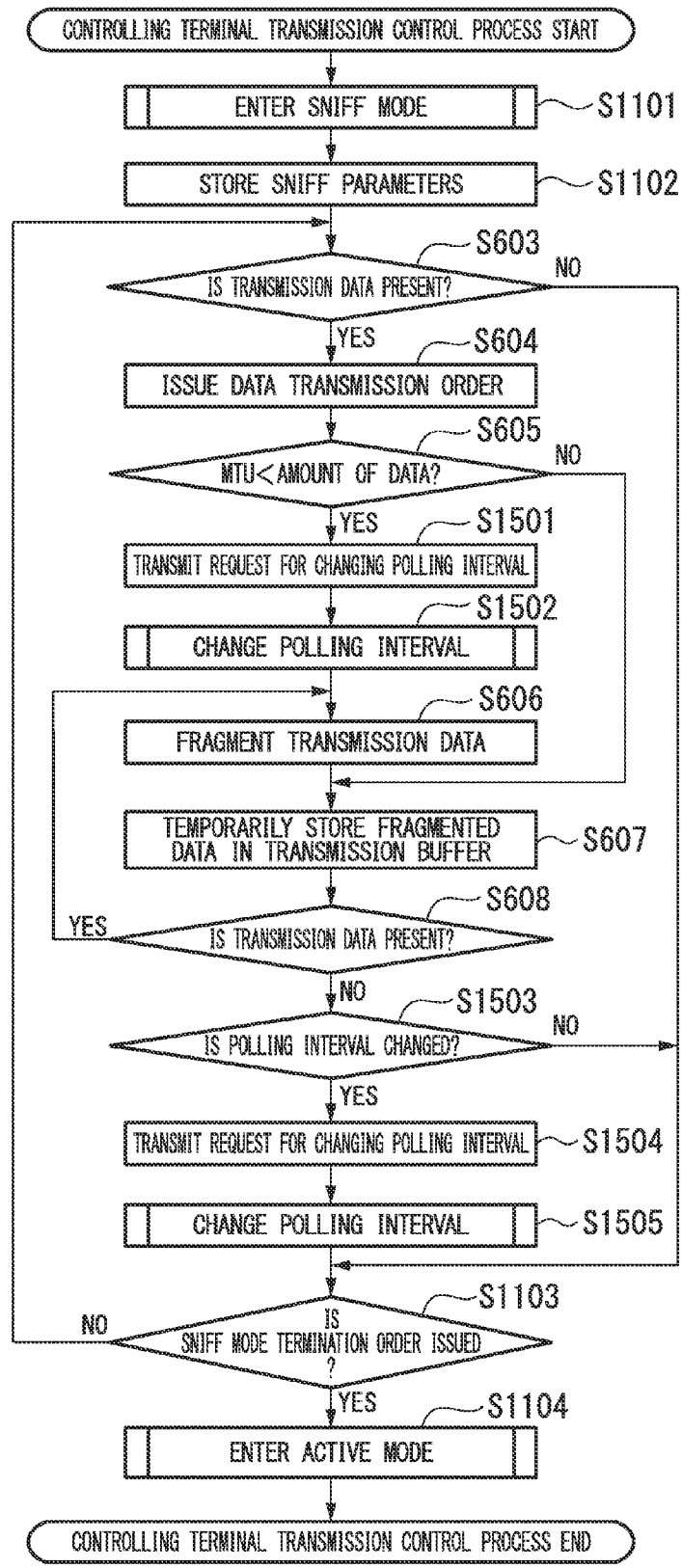
FIG. 15 is a flowchart illustrating an operational procedure for a controlling terminal according to a second modified example of the embodiment of the present invention.

FIG. 15 illustrates a transmission control process for the controlling terminal of the second modified example. If it is determined in step S605 shown in FIG. 11 that the amount of the transmission data exceeds the MTU, the controlling terminal transmits to the controlled terminal, a request for changing the polling interval so that the polling is performed within the transmission period in the sniff mode (step S1501), thus changing the poling interval of the controlling terminal (step S1502). If it is determined step S608 that transmission data not temporarily stored in the transmission buffer 401 are not present In the storage unit 403, the controlling terminal determines whether or not the polling interval has been changed from the Initial state (step S1503). Additionally, if it is determined in step S1503 that the polling interval has been changed from the initial state, the controlling terminal transmits to the controlled terminal, a request for changing the polling interval from the interval changed in steps S1501 and S1502 to the interval before changed (step S1504), thus changing the polling interval of the controlling terminal (step S1505). A polling interval changing process shown in steps S1504 and S1505 will be explained later.

Figure 16:
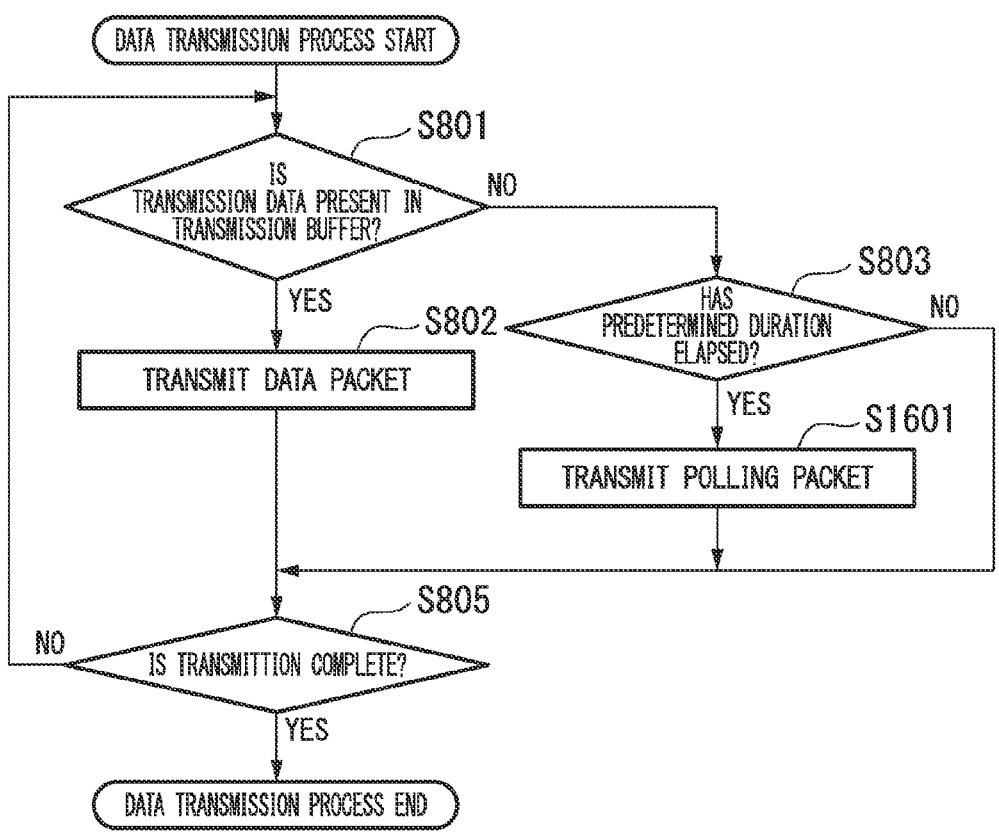
FIG. 16 is a flowchart illustrating an operational procedure for a controlling terminal according to the second modified example of the embodiment of the present invention.

FIG. 16 illustrates a data transmission process (corresponding to FIG. 8) for the controlling terminal of the second modified example. The controlling terminal of the second modified example performs, based on the polling interval, the process in step S803 of determining whether or not the predetermined duration has elapsed. Further, if it is determined in step S803 that the predetermined duration has elapsed, the controlling terminal transmits a polling packet as a dummy packet (step S1601).

Figure 17:
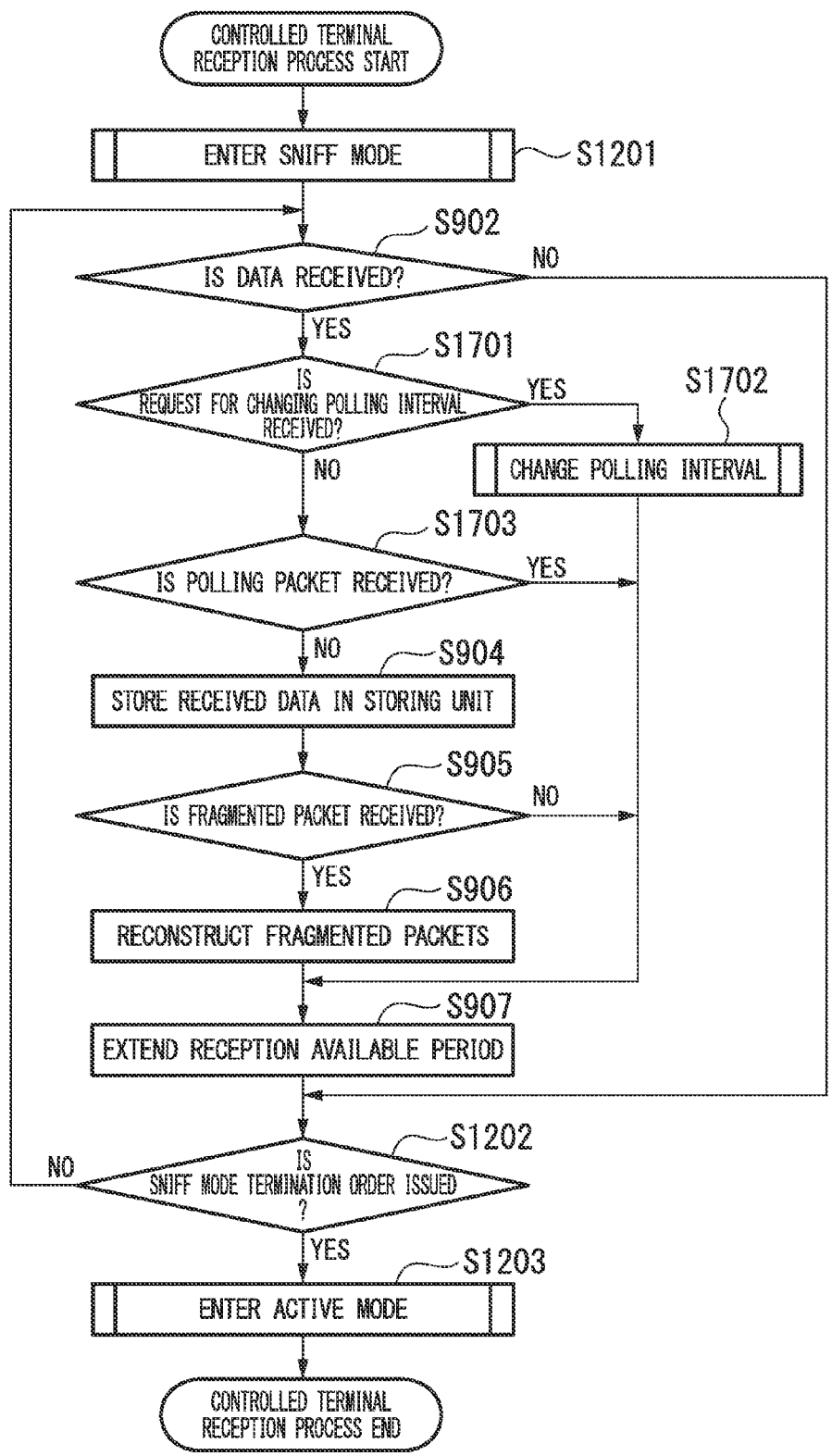
FIG. 17 is a flowchart illustrating an operational procedure for a controlled terminal according to the second modified example of the embodiment of the present invention.

FIG. 17 illustrates a data reception process for the controlled terminal of the second modified example. After it is determined in step S902 shown in FIG. 12 that data has been received (step S1701), the controlled terminal further determines whether or not the received data is a request for changing the polling interval. After it is determined that the data received in step S1701 is a request for changing the polling interval, the controlled terminal changes the polling interval of the controlled terminal (step S1702). After it is determined that the data received in step S1701 is not a request for changing the polling interval, the controlled terminal determines whether or not the received data is a polling packet (step S1703), as a process of determining whether or not a dummy packet is received (step S1703).

Figure 18:
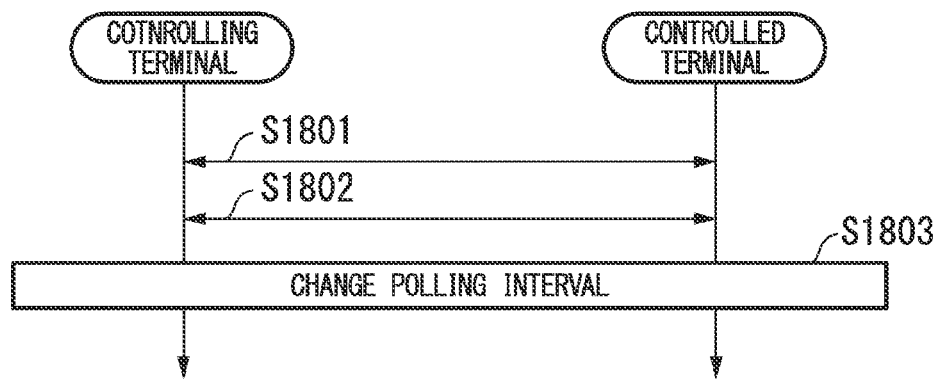
FIG. 18 is a sequence chart illustrating a polling interval changing process according to the second modified example of the embodiment of the present invention.

FIG. 18 illustrates a sequence of a process of changing an interval for the controlling terminal to transmit the polling packet in the case of the Bluetooth (trademark) communication, A polling interval changing process is explained with reference to FIG. 18.

In the polling interval changing process, firstly, one of the controlling terminal and the controlled terminal transmits to the other terminal, a polling interval changing request for changing the interval for transmitting the polling packet (step S1801). Here, the polling interval changing request corresponds to the packet of LMP_quality_of_service_req disclosed in Non-Patent Document 1, includes a value of the changed polling interval, includes a value of the changed polling interval and the like, and requests for changing the polling interval.

If the terminal having received the polling interval changing request accepts the received value of the polling interval, the terminal having received the request transmits to the other terminal having transmitted the request, a polling interval changing response indicating acceptance of the request. If the terminal having received the polling interval changing request rejects the received value of the polling interval, the terminal having received the request transmits to the other terminal having transmitted the request, a polling interval changing response indicating rejection of the request (step S1802). The polling interval changing response indicating acceptance of the request corresponds to the packet of LMP_accepted disclosed in Non-Patent Document 1. The polling interval changing response indicating rejection of the request corresponds to the packet of LMP_not_accepted disclosed in Non-Patent Document 1.

The polling interval is changed after the polling interval changing request is accepted (step S1803).

Third Modified Example

Figure 19:
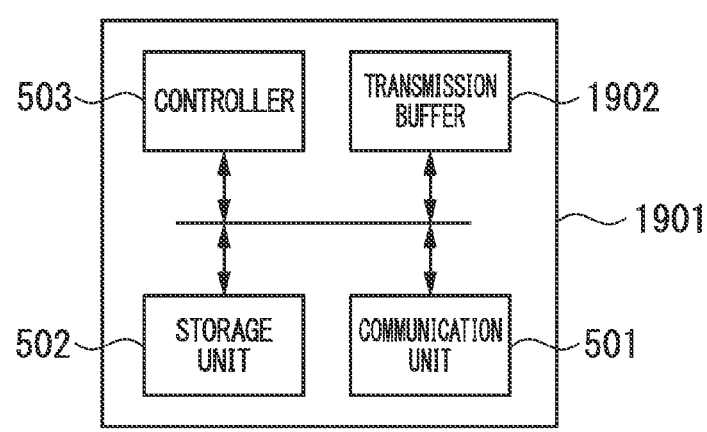
FIG. 19 is a block diagram illustrating a controlled terminal according to a third modified example of the embodiment of the present invention.

In a case where the above embodiment is applied to the Bluetooth (trademark) communication as shown in the second modified example, and the controlled terminal has the configuration shown in FIG. 19, the controlled terminal may be configured to transmit data.

As shown in FIG. 19, a controlled terminal 1901 of the third modified example further includes a transmission buffer 1902 that temporarily stores transmission packets, in addition to the configuration of the reception terminal 6 of the above embodiment. Hereinafter, the operation for the controlled terminal to transmit data to the controlling terminal is explained. A reception process, a transmission control process, and a data transmission process for the controlling terminal and the controlled terminal of the third modified example are respectively shown in FIGS. 20, 21, and 22.

Figure 20:
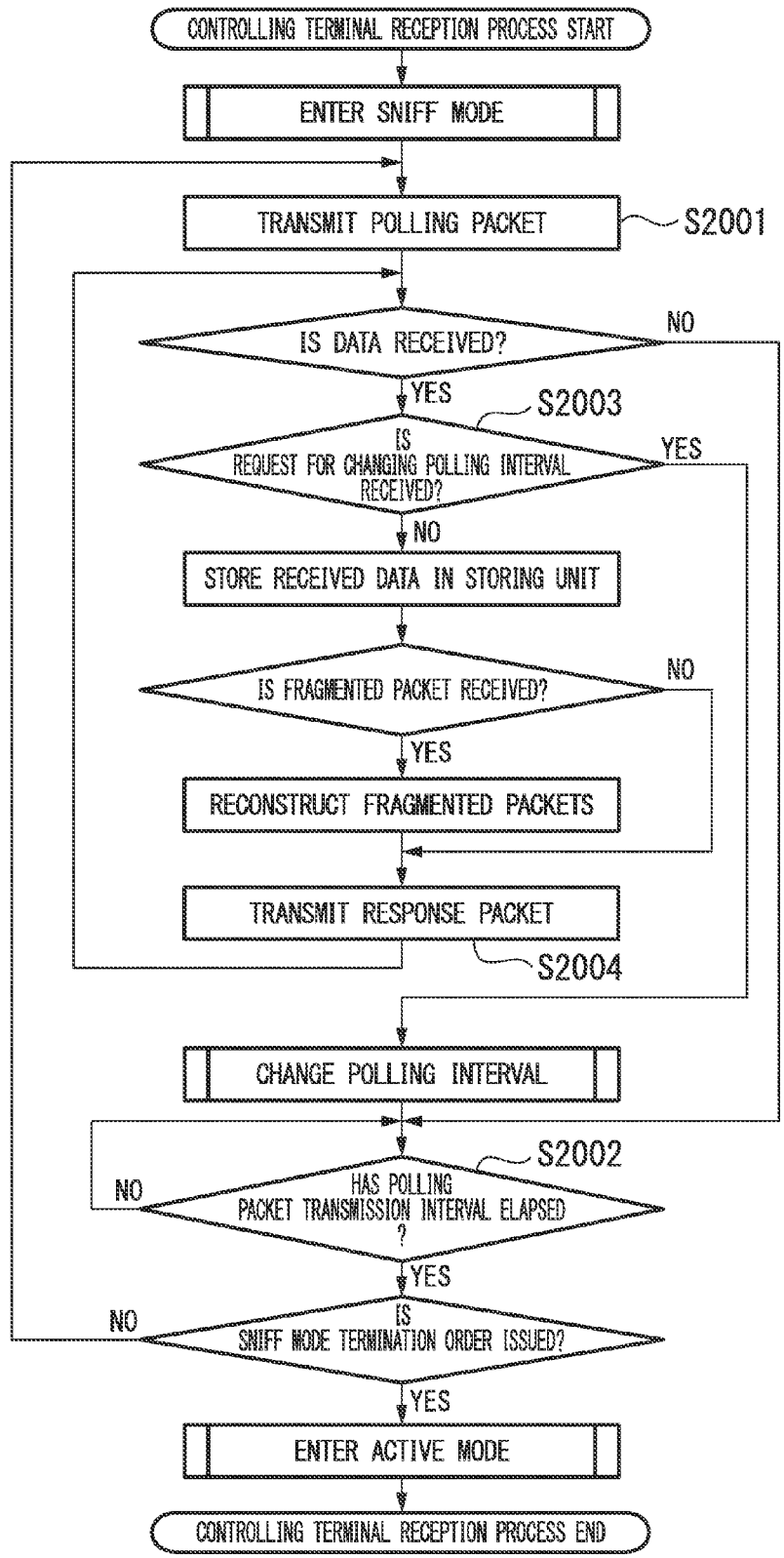
FIG. 20 is a flowchart illustrating an operational procedure for a controlling terminal according to the third modified example of the embodiment of the present invention.
Figure 21:
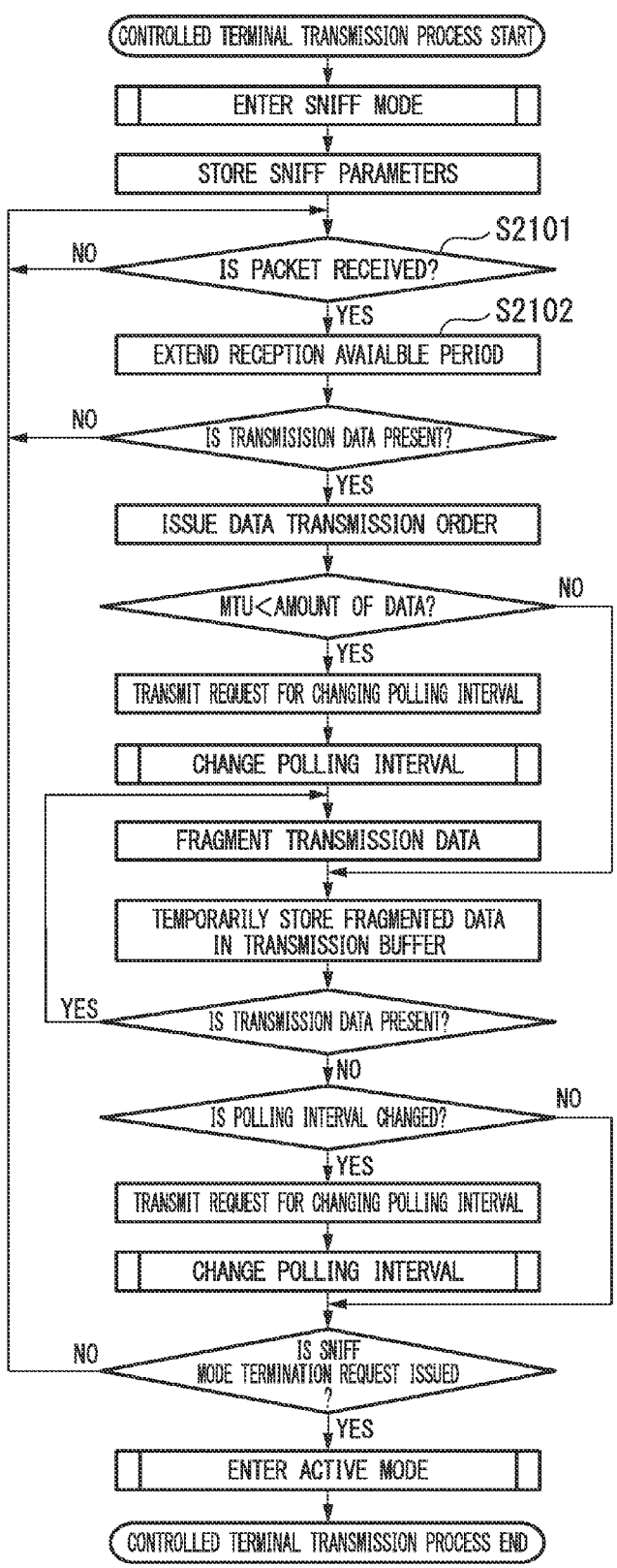
FIG. 21 is a flowchart illustrating an operational procedure for a controlled terminal according to the third modified example of the embodiment of the present invention.

FIG. 20 illustrates the reception process of the controlling terminal of the third modified example. A polling packet transmission process (step S2001), a polling packet reception interval elapsing determination process (step S2002), a polling interval changing request reception determination process (step S2003), and a response packet transmission process (step S2004) differ, and the other processes are the same as those for the reception terminal of the above embodiment or the controlled terminal of the above modified examples. In step S2001, a polling packet that enables the controlled terminal to transmit data is transmitted. In step S2002, it is determined whether or not the defined polling interval has elapsed, in order to periodically transmit a polling packet. In step S2003, it is determined whether or not a request for changing the polling interval is received from the controlled terminal. In step S2004, a response packet is transmitted to the controlled terminal when data other than the polling interval changing request, which requires that a response be transmitted after the reception, are received, FIG. 21 illustrates the transmission control process for the controlled terminal of the third modified example, A packet reception determination process (step S2101) and a reception available period extension process (step S2102) differ, and the other processes are similar to those for the transmission terminal of the above embodiment and the controlling terminal of the above modified examples. In step S2101, it is determined whether or not a packet for initiating the transmission process is received from the controlling terminal The reception of the packet triggers the initiation of the transmission process. In step S2102, the reception available period is extended if it is determined in step S2101 that the packet has been received.

Figure 22:
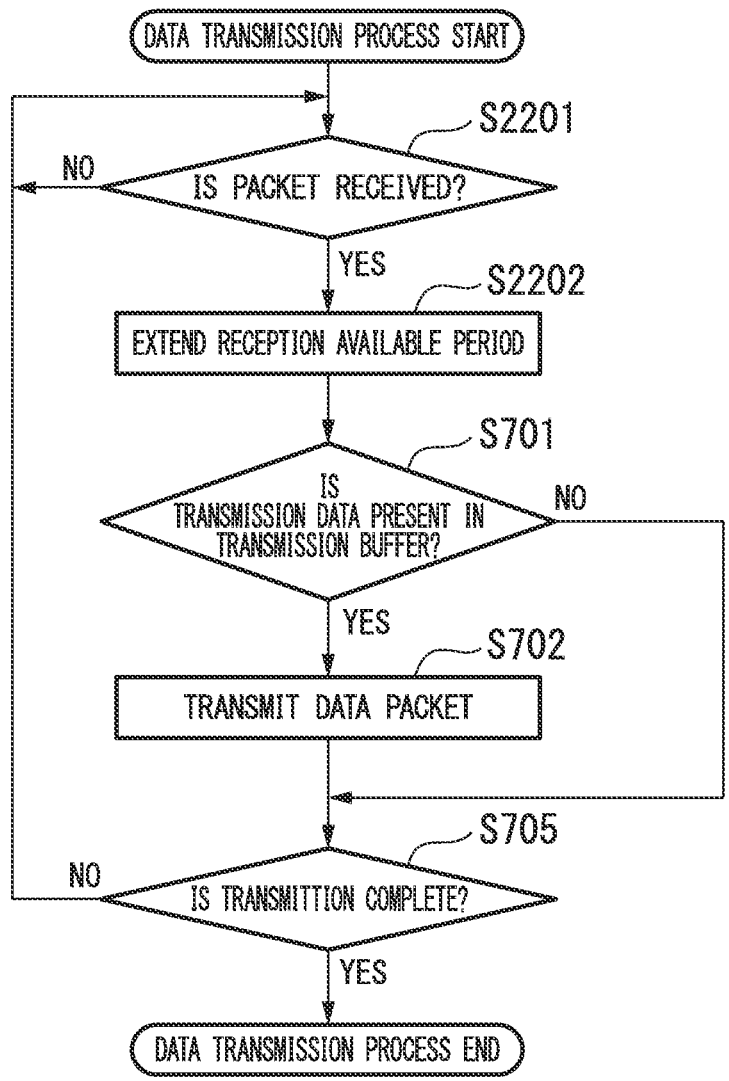
FIG. 22 is a flowchart illustrating an operational procedure for a controlled terminal according to the third modified example of the embodiment of the present invention.

FIG. 22 illustrates the data transmission process for the controlled terminal of the third modified example. The operation shown in FIG. 22 is performed when the data transmission order is issued in the operation shown in FIG. 21. A packet reception determination process (S2201) and a reception available period extension process (S2202) differ, and the other processes are similar to the data transmission process of the above embodiment and the data transmission process of the above modified examples. In step S2201, it is determined whether or not a packet for initiating the transmission process is received from the controlling terminal. The reception of the packet triggers the initiation of the transmission process. In step S2202, the reception available period is extended if it is determined in step S2201 that the packet has been received.

Fourth Modified Example

Figure 23:
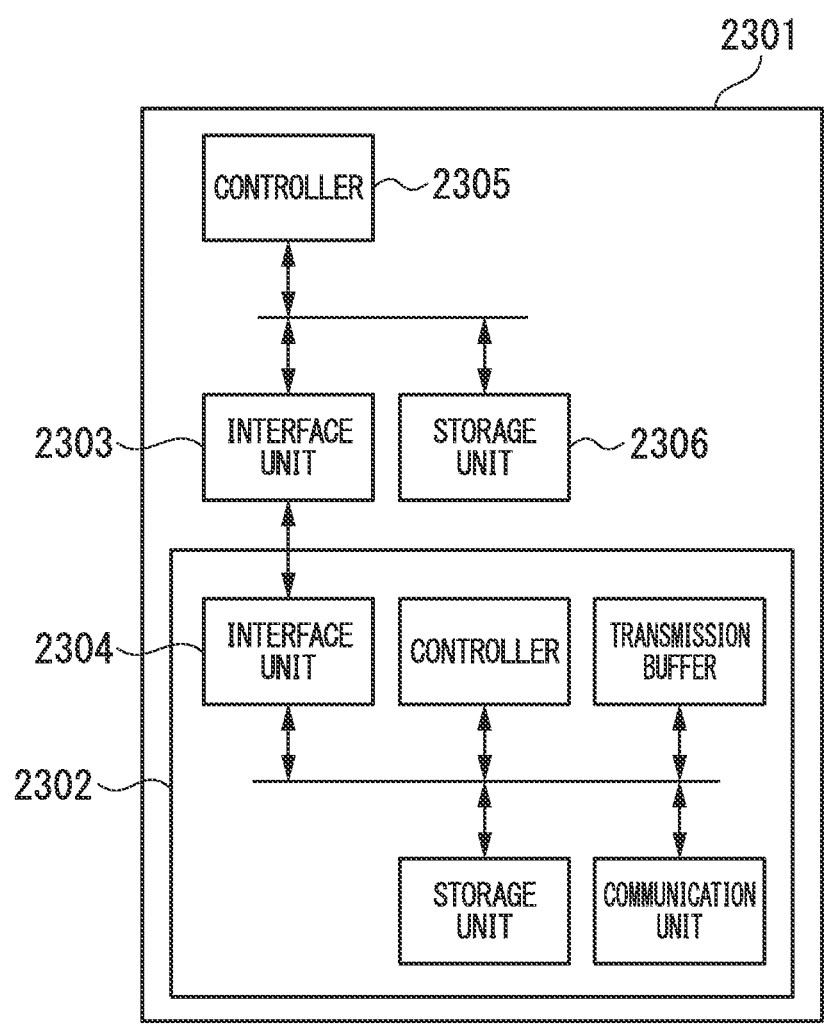
FIG. 23 is a block diagram illustrating an external terminal and a communication terminal according to a fourth modified example of the embodiment of the present invention.

As shown in FIG. 23, an external terminal 2301 may be connected to a communication terminal 2302, which corresponds to any one of the transmission terminal and the reception terminal of the above embodiment, and the controlling terminal and the controlled terminal of the above modified examples. Then, the communication terminal 2302 may be controlled by a controller 2305 included in the external terminal 2301. In this case, the external terminal 2301 and the communication terminal 2302 are connected via an Interface unit 2303 included in the external terminal 2301 and an interface unit 2304 included in the communication terminal 2302.

Additionally, data stored In a storage unit 2306 included in the external terminal 2301 may be transmitted to an external terminal via the communication terminal 2302. Further, the communication terminal 2302 may be configured to store in the storage unit 2306, data received from an external terminal. Moreover, the communication terminal 2302 may be configured to be a memory device, such as a flash memory card.

The embodiment of the present invention has been explained above with reference to the drawings. It is apparent that the present invention is not limited to the above embodiments, and may be modified and changed without departing from the scope of the invention.

As used herein, the following directional terms "forward," "rearward," "above," "downward," "vertical," "horizontal," "below," and "transverse," as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, section or part of a device which includes hardware and/or software that is constructed and/or programmed to carry out the desired function.

The terms of degree such as "substantially," "about," and "approximately" as used herein mean a reasonable amount of deviation of the modified term such that the end result is not significantly changed. For example, these terms can be construed as including a deviation of at least ±5 percent of the modified term if this deviation would not negate the meaning of the word it modifies.

What is claimed is:

1. A wireless communication terminal comprising:
a communication unit configured to wirelessly communicate with a reception terminal;
a storage unit configured to store timing information relating to a timing at which the reception terminal changes from a first operation mode to a second operation mode, the first operation mode being a mode in which the reception terminal is able to receive data during a first period, the second operation mode being a mode in which the reception terminal is unable to receive the data during a second period, and the first period being extended by a fixed duration when the reception terminal in the first operation mode receives the data;
a transmission buffer configured to temporarily store a plurality of segmented data constituting transmission data to be transmitted from the communication unit to the reception terminal; and
a controller configured to control the communication unit to wirelessly transmit dummy data to the reception terminal by the timing when no segmented data is stored in the storage unit by the timing.

2. The wireless communication terminal according to claim 1, wherein the communication unit is configured to wirelessly receive the timing information from the reception terminal at the time prior to the time when the transmission data is wirelessly transmitted to the reception terminal, and
the storage unit is configured to store the timing information received.

3. The wireless communication terminal according to claim 2, wherein the timing information includes information relating to the first period and the second period.

4. The wireless communication terminal according to claim 1, wherein the reception terminal in the first operation mode is configured to perform only reception,
the reception terminal in the second operation mode is configured to perform only transmission,
the reception terminal is configured to switch between the first operation mode and the second operation mode alternately, and
the controller is configured to control the communication unit to wirelessly transmit the dummy data to the reception terminal when the reception terminal is in the first operation mode.

5. The wireless communication terminal according to claim 4, wherein the communication unit has the first operation mode and the second operation mode identical to the first operation mode and the second operation mode of the reception terminal,
the communication unit is configured to be in the first operation mode while the reception terminal is in the second operation mode, and
the communication unit is configured to be in the second operation mode while the reception terminal is in the first operation mode.

6. A memory device comprising:
a communication unit configured to wirelessly receive from a reception terminal, timing information relating to a timing at which the reception terminal changes from a first operation mode to a second operation mode, the first operation mode being a mode in which the reception terminal is able to receive data during a first period, the second operation mode being a mode in which the reception terminal is unable to receive data during a second period, the first period being extended by a fixed duration when the reception terminal in the first operation mode receives data;
a storage unit configured to store the timing information;
a transmission buffer configured to temporarily store a plurality of segmented data constituting transmission data to be transmitted from the communication unit to the reception terminal; and
a controller configured to control the communication unit to wirelessly transmit dummy data to the reception terminal by the timing when no segmented data is stored in the storage unit by the timing.

7. A wireless communication system comprising:
a reception terminal; and
a transmission terminal,
wherein the reception terminal has a first operation mode and a second operation mode, the first operation mode being a mode in which the reception terminal is able to receive data during a first period, the second operation mode being a mode that the reception terminal is unable to receive data during a second period subsequent to the first period, the first period being extended by a fixed duration when the reception terminal in the first operation mode receives data,
the reception terminal comprises a first communication unit configured to wirelessly communicate with the transmission terminal, and
the transmission terminal comprises:
a second communication unit configured to wirelessly communicate with the reception terminal;
a storage unit configured to store timing information relating to a timing at which the reception terminal changes from the first operation mode to the second operation mode;

a transmission buffer configured to temporarily store a plurality of segmented data that constitute transmission data to be transmitted from the communication unit to the reception terminal; and a controller configured to control the second communication unit to wirelessly transmit dummy data to the reception terminal by the timing when no segmented data is stored in the storage unit by the timing.

8. A wireless communication method for a transmission terminal, comprising:

storing in a storage unit, timing information relating to a timing at which a reception terminal changes from a first operation mode to a second operation mode, the first operation mode being a mode in which the reception terminal is able to receive data during a first period, the second operation mode being a mode in which the reception terminal is unable to receive data during a second period, the first period being extended by a fixed duration when the reception terminal in the first operation mode receives the data;

temporarily storing in a transmission buffer, a plurality of segmented data constituting transmission data to be transmitted to the reception terminal; and wirelessly transmitting dummy data to the reception terminal by the timing when no segmented data is stored in the storage unit by the timing.

9. A non-transitory computer-readable recording medium storing computer-readable instructions that cause a computer of a wireless communication device to execute:

storing in a storage unit, timing information relating to a timing at which a reception terminal changes from a first operation mode to a second operation mode, the first operation mode being a mode in which the reception terminal is able to receive data during a first period, the second operation mode being a mode in which the reception terminal is unable to receive data during a second period, the first period being extended by a fixed duration when the reception terminal in the first operation mode receives the data;

temporarily storing in a transmission buffer, a plurality of segmented data constituting transmission data to be transmitted to the reception terminal; and wirelessly transmitting dummy data to the reception terminal by the timing when no segmented data is stored in the storage unit by the timing.

10. A wireless communication method for a transmission terminal, comprising:

transmitting first data of a plurality of segmented data to a reception terminal in a first period in which the reception terminal is able to receive data, the first period being followed by a second period in which the reception terminal is unable to receive data, and the first period being extended by a first duration when the reception terminal receives the data in the first period;

while transmitting the first data, determining whether or not second data of the segmented data is temporarily stored, the second data being transmitted to the reception terminal after the first data; and in a case that the second data is not temporarily stored, transmitting dummy data to the reception terminal in the first period extended by the first duration.

11. The wireless communication method for the transmission terminal according to claim 10, further comprising:

when the transmission terminal determines that the second data is not temporarily stored, determining whether or not a second duration elapses after transmitting the first data, wherein transmitting the dummy data when the second duration elapses after transmitting the first data.

12. The wireless communication method for the transmission terminal according to claim 10, further comprising:

when the second data is not temporarily stored, determining whether or not a second duration elapses after transmitting the first data; and when the second duration has elapsed after transmitting the first data, determining whether or not all of the segmented data have been transmitted to the reception terminal.

13. The wireless communication method for the transmission terminal according to claim 10, further comprising:

when the second data is temporarily stored, determining whether or not all of the segmented data have been transmitted to the reception terminal.

14. The wireless communication method according to claim 11, wherein the second duration is previously stored.

15. The wireless communication method according to claim 10, further comprising:

before transmitting the first data, receiving from the reception terminal, first information relating to the first period and the second period, and the first duration; and before transmitting the first data, storing the first information.

16. A wireless transmission method for a first terminal, comprising:

transmitting first data of a plurality of segmented data to a second terminal in a first period in which the first terminal and the second terminal can respectively perform transmission and reception, the first period being followed by a second period in which the first terminal and the second terminal can respectively perform reception and transmission, the first period and the second period continuing alternately, the first period being extended by a first duration when the second terminal receives data in the first period;

while transmitting the first data, determining whether or not second data of the segmented data is temporarily stored, the second data being transmitted to the second terminal after the first data; and in a case that the first terminal determines that the second data is not temporarily stored, transmitting dummy data to the second terminal in the first period extended by the first duration.

17. The wireless communication method for the first terminal according to claim 16, further comprising:

when the first terminal determines that the second data is not temporarily stored, determining whether or not a second duration elapses after transmitting the first data, wherein transmitting the dummy data when the second duration elapses after transmitting the first data.

18. The wireless communication method for the first terminal according to claim 16, further comprising:

when the first terminal determines that the second data is not temporarily stored, determining whether or not a second duration elapses after transmitting the first data; and when the second duration has elapsed after transmitting the first data, determining whether or not all of the segmented data have been transmitted to the second terminal.

19. The wireless communication method for the first terminal according to claim 16, further comprising:

when the first terminal determines that the second data is temporarily stored, determining whether or not all of the segmented data have been transmitted to the second terminal.

20. The wireless communication method for the first terminal according to claim 16, further comprising:

before transmitting the first data, receiving from the second terminal, first information relating to the first period and the second period, the first duration, and the second duration; and before transmitting the first data, storing the first information.

\* \* \* \* \*